US008082440B2

United States Patent
Merizan et al.

(10) Patent No.: US 8,082,440 B2
(45) Date of Patent: Dec. 20, 2011

(54) MANAGED DATA REGION FOR SERVER MANAGEMENT

(75) Inventors: Mark Merizan, Sherwood, OR (US); Neil Bradley, Tigard, OR (US); Patrick Mason, Beaverton, OR (US); Brad Davis, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 12/240,168

(22) Filed: Sep. 29, 2008

(65) Prior Publication Data

US 2011/0016297 A1 Jan. 20, 2011

(51) Int. Cl.
G06F 9/00 (2006.01)
G06F 9/24 (2006.01)
G06F 15/177 (2006.01)
G06F 1/24 (2006.01)
G06F 1/00 (2006.01)
G06F 13/00 (2006.01)

(52) U.S. Cl. ............ 713/100; 713/1; 713/166; 713/300; 711/150; 711/151; 711/152; 711/153

(58) Field of Classification Search .............. 713/1, 100, 713/300; 711/150, 151, 152, 153
See application file for complete search history.

(56) References Cited

U.S. PATENT DOCUMENTS

| 7,600,106 | B2 * | 10/2009 | Wang | 713/1 |
| 2005/0021918 | A1 * | 1/2005 | Hwang et al. | 711/163 |
| 2009/0132799 | A1 * | 5/2009 | Brumley et al. | 713/100 |
| 2009/0261172 | A1 * | 10/2009 | Kumar et al. | 235/492 |
| 2010/0013606 | A1 * | 1/2010 | Gallo et al. | 340/10.51 |

* cited by examiner

Primary Examiner — Thomas Lee
Assistant Examiner — Samantha Hoang
(74) Attorney, Agent, or Firm — Buckley, Maschoff & Talwalkar LLC

(57) ABSTRACT

Some aspects include reception of a command from one of a chassis management module and a BIOS specifying a data region to be updated and a locking policy, determination of whether the data region is locked, implementation of the locking policy and returning of a session lock handle if it is determined that the data region is not locked, reception, from the one of the chassis management module and the BIOS, of data for updating the data region, the session lock handle, and an offset, determination that the session lock handle is associated with the data region, writing of the data to the data region at the offset, reception of a request for data of the updated data region from the other one of the chassis management module and the BIOS, determination of whether the updated data region is locked, and if it is determined that the updated data region is not locked, providing of the data of the updated data region to the other one of the chassis management module and the BIOS.

14 Claims, 3 Drawing Sheets

MANAGED DATA REGION FOR SERVER MANAGEMENT

BACKGROUND

A modular server includes several distinct servers, or blade servers. The blade servers are mounted in a chassis, which in turn couples the servers to hard disk storage, an Ethernet connection, a keyboard and/or a mouse via respective interfaces. This arrangement allows the blade servers to share these peripheral devices and to be managed centrally.

In order to manage a blade server, a chassis management module (CMM) requires information from the BIOS (i.e., low level firmware) of the blade server. Since the CMM may or not be active when the blade information becomes available (e.g., during boot), a Baseboard Management Controller (BMC) acts as a repository for this information until the CMM requests it. The CMM is responsible for maintaining this information.

Since blade servers and the CMM can each be hot-swapped, the BMC data should maintain an up-to-date version of the blade information. However, the BIOS information is only transmitted from a blade at boot time, and cannot be obtained once the blade OS is up. Systems are desired to maintain current BIOS information through the various combinations of hot swap, BMC firmware update, or reset.

DETAILED DESCRIPTION

Figure 1:
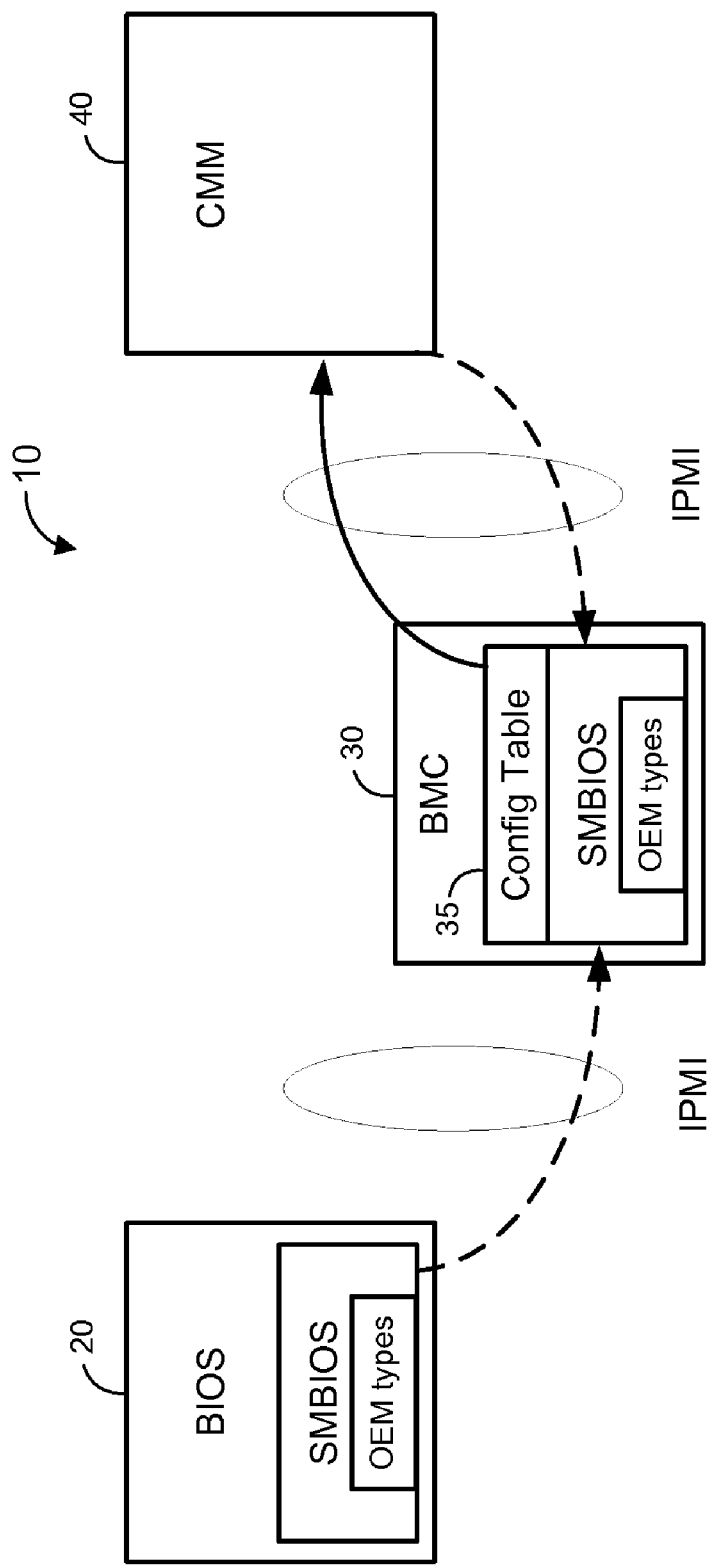
FIG. 1 is a block diagram of a system according to some embodiments.

FIG. 1 is a block diagram of system 10 according to some embodiments. System 10 includes BIOS 20, BMC 30 and CMM 40. System 10 may comprise elements of a modular server such as the Intel® Modular Server, but embodiments are not limited thereto. Each element of system 10 may comprise any suitable combination of hardware and software for performing the functions described herein.

BIOS 20 may reside on a server module and include information specific to the server module. This information may include, but is not limited to, blade configuration table (BCT) data and SMBIOS data.

BMC 30 may be responsible for management local to the server module of BIOS 20. Such management may include power control, reset, sensor reading, remote KVM, remote media and remote serial console. BMC 30 may also collect events for storage in a server event log. BMC 30 may itself be managed by CMM 40.

CMM 40 may provide configuration and management capabilities for system 10. CMM 40 may monitor events, log their occurrence, and provide an interface to the logged information for use by system management software.

In general operation, BIOS 20 may forward BCT data and/or SMBIOS data to BMC 30 for storage in data repository 35. BMC 30 uses selected fields of the SMBIOS data to determine configuration data. CMM 40 may acquire the BCT/SMBIOS data from data repository 35 to maintain its own tables. Moreover, CMM 40 can reload the BCT/SMBIOS data into data repository 35 if BMC 30 has been reset for any reason (e.g., firmware update) subsequent to BIOS booting of BIOS 20.

As shown, BIOS 20 and CMM 40 each may communicate with BMC 30 as described herein using commands conforming to an Intelligent Platform Management Interface (IPMI) specification. The dotted arrows indicate asynchronous communication while the solid arrow indicates synchronous communication. Embodiments are not limited to an IPMI specification.

Figure 2:
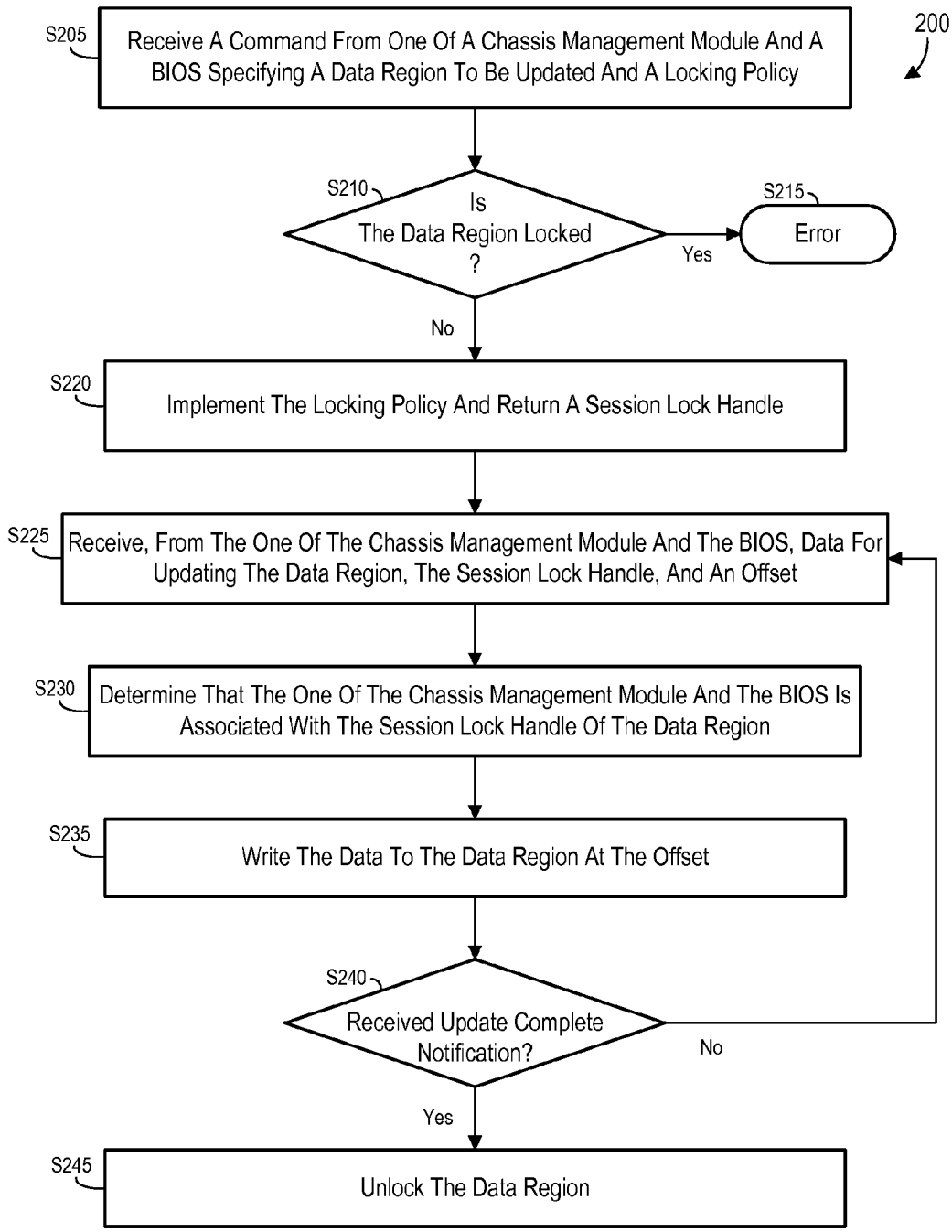
FIG. 2 is a flow diagram of a process according to some embodiments.

FIG. 2 is a flow diagram of process 200 that may be executed by BMC 30 according to some embodiments. Process 200 may be embodied by any combination of hardware or software. In some embodiments, process 200 is embodied by software stored in a memory and executed by a microprocessor of BMC 30.

Initially, at S205, BMC 30 receives a command from either CMM 40 or BIOS 20. The command specifies a data region to be updated and a locking policy. The command may comprise an IPMI command. BMC 30 determines whether the specified data region is already locked at S210. If so, an error message is returned at S215.

Flow proceeds to S220 if it is determined that the specified data region is not already locked. At S220, BMC 30 implements the locking policy and returns a session lock handle.

According to some embodiments, the specified locking policy may comprise one of the following: Unlocked, Strict Lock and Preemptable Lock. In order to implement the Unlocked policy, BMC 30 unlocks the region without completing the operation. If a Strict Lock is implemented, writes to the region are accepted only from the producer (e.g., BIOS 20 or CMM 40) which issued the lock command. All reads are rejected until writing is complete, and no requests to break the lock from other producers are honored. In some embodiments, BIOS 20 specifies the Strict Lock policy when issuing the command received at S205. In this regard, it may be useful to allow BIOS 20 to break its own lock to account for an unexpected restart of BIOS 20 during update.

According to the Preemptable Lock policy, writes to the specified region are only accepted from the producer which issued the lock command, and all reads are rejected until writing is complete. A request for a Strict Lock from another producer would result in the current Preemptable Lock being released and a new lock established. CMM 40 may specify the Strict Locking policy when issuing the command received at S205.

In some embodiments, S210 includes a determination of whether the region is not locked or whether the existing lock (e.g., Preemptable Lock) can be preempted by the locking policy (e.g., Strict Lock) specified by the received command. Moreover, S220 may include starting a Region-Update-Timer, incrementing a Region-Update-Count (i.e., even if the lock is being broken by the original locker), and clearing a Region-Data-Valid flag. The Region-Data-Valid flag may be initialized to FALSE and may be used to indicate whether the data currently in data repository 35 is not trustworthy.

A session lock handle is returned at S220. Also, in some embodiments, a response code is also returned. Examples of such a response code include Success, Region-Invalid, Region-Not-Locked, and Region-Update-In-Progress.

The producer, using the session lock handle, then sends BMC 30 the data to be updated and an offset. An indication of the length of the data may also be sent in some embodiments. This information is received by BMC 30 at S225. On receipt of a write command, BMC 30 may, at S230, ensure that the producer currently holds the region lock, ensure that the data offset and length lies entirely within the region to be updated.

Next, at S235, BMC 30 writes the data to the data region at the offset. Some embodiments further include refreshing a Region-Update-Timer and returning a proper completion code, such as Success, Region-Invalid, Region-Offset-Invalid, Region-Length-Invalid, and Repository-Update-In-Progress.

BMC 30 determines whether a Repository-Update-Complete notification has been received from the producer at S240. If not, flow returns to S225 and continues as described above to write more data to the region. Flow continues to cycle between S225 and S240 until a Repository-Update-Complete notification is received. During this cycling, BMC 30 may respond with "busy" (Repository-Update-In-Process) to competing read or write operations.

Flow proceeds to S245 once the producer, using the session lock handle, sends BMC 30 an IPMI command specifying Repository-Update-Complete. BMC 30 unlocks the data region at S245. BMC 30 may also confirm that the sender of the command held the lock on the data region prior to unlocking the data region, and may cancel the Region-Update-Timer, set the Region-Data-Valid flag, increment the Region-Update-Count, unlock the region, and return an appropriate response code. Response codes may include Success, Region-Invalid, Region-Not-Locked, and Region-Update-In-Progress. BMC 30 may also attempt to notify CMM 40 that new data is available.

Referring to the aforementioned Region-Update-Timer, if a producer locks a data region but does not service it within a specified timeout, BMC 30 may generate a Region-Update-Timeout notification and unlock the region. Since the Region-Data-Valid flag is cleared at the start of the update process it does not need to be cleared again at this point.

Figure 3:
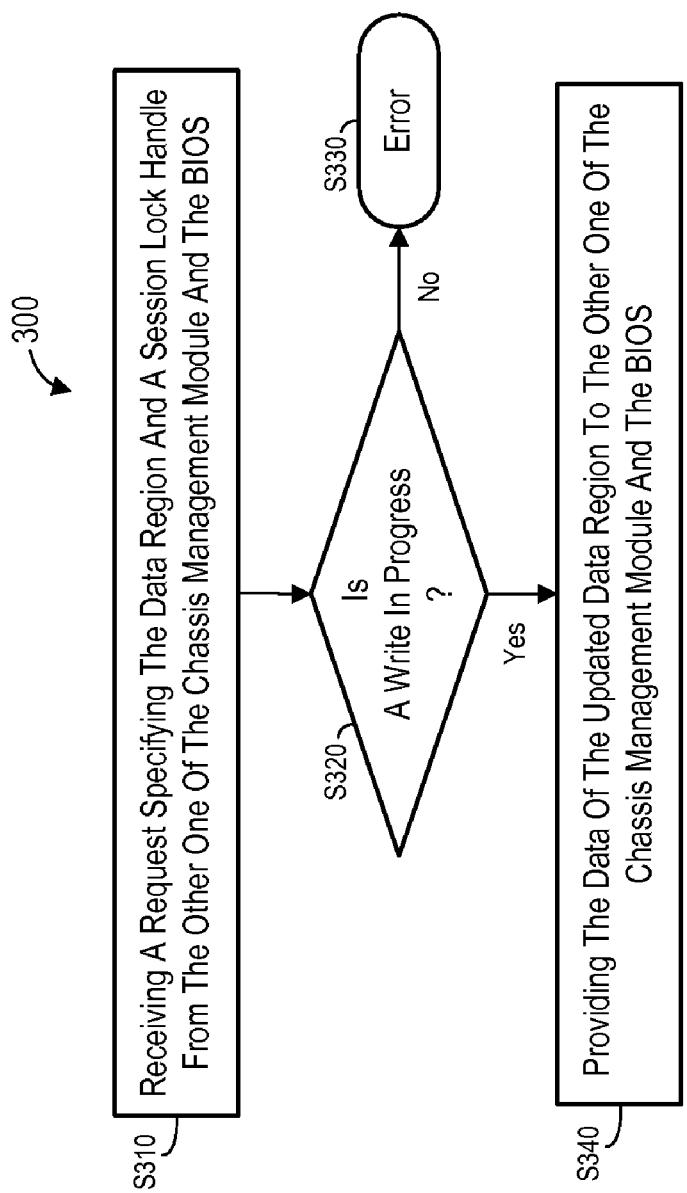
FIG. 3 is a flow diagram of a process according to some embodiments.

FIG. 3 is a flow diagram of process 300 that may be executed by BMC 30 according to some embodiments. Process 300 may be embodied by any combination of hardware or software. In some embodiments, process 300 is embodied by software stored in a memory and executed by a microprocessor of BMC 30.

Process 300 specifies a read operation according to some embodiments. A read request is issued by a consumer (e.g., CMM 40 or BIOS 20) prior to process 300. According to process 300, the request is issued by an entity different from the entity which issued the write command received at S205 of process 200. The read request is received by BMC 30 at S310, and specifies a region and a session lock handle (or 0 if the consumer does not hold a lock). The request may also include a length and an offset.

At S320, BMC 30 will determine whether a write operation is in progress. If so, BMC 30 will respond with an error message (e.g., Region-Update-In-Progress). S320 may also comprise determining whether the data offset and length lies entirely within the region, and checking the Region-Data-Valid flag.

The data is provided to the consumer from whom the request was received at S340. In some embodiments, the Region-Update-Count is also returned, along with a Success response code.

The foregoing descriptions focus primarily on the behavior of BMC 30 according to some embodiments. BIOS 20 and CMM 40 may perform actions corresponding and complementary to the behavior of BMC 30 as described above. For example, during a write process, BIOS 20 may initiate a Strict Lock on the SMBIOS data region, monitor a code returned by BMC 30 in response to each write command, and issue a Repository-Update-Complete command when finished writing.

In accessing repository 35, CMM 40 may monitor a code returned by BMC 30 in response to a read command and back off/restart if the code specifies Region-Update-In-Progress, monitor the Region-Update-Count value on all reads to determine whether the data has changed during the read process, and base data integrity on a successful read of the entire region without a Region-Update-In-Progress indication or a change in the Region-Update-Count value. CMM 40 may also update data repository 35 as deemed necessary using a Preemptable Lock for all data which BIOS 20 may need to update, may monitor a code returned by BMC 30 in response to each write command, and abort if a Region-Update-In-Progress indication is received.

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A method comprising:
    receiving a command from one of a chassis management module and a BIOS specifying a data region to be updated and a locking policy;
    determining if the data region is locked;
    if it is determined that the data region is not locked, implementing the locking policy and returning a session lock handle;
    receiving, from the one of the chassis management module and the BIOS, data for updating the data region, the session lock handle, and an offset;
    determining that the session lock handle is associated with the data region;
    writing the data to the data region at the offset;
    receiving a request for data of the updated data region from the other one of the chassis management module and the BIOS;
    determining if the updated data region is locked; and
    if it is determined that the updated data region is not locked, providing the data of the updated data region to the other one of the chassis management module and the BIOS.

2. A method according to claim 1, wherein the command and the request conform to an Intelligent Platform Management Interface specification.

3. A method according to claim 1, further comprising:
    before receiving the request, receiving a command indicating that no more data will be transmitted in association with the session lock handle.

4. A method according to claim 1, further comprising:
    if it is determined that the data region is locked, transmitting an error message to the one of the chassis management module and the BIOS.

5. A method according to claim 1, further comprising:
    if it is determined that the updated data region is locked, transmitting an error message to the other one of the chassis management module and the BIOS.

6. A method according to claim 1, wherein the locking policy comprises a preemptable lock.

7. A method according to claim 1, further comprising resetting an update timeout in response to receiving the data for updating the data region, the session lock handle, and the offset.

8. An apparatus comprising:
    a BIOS;
    a chassis management module; and
    a baseboard management controller to:

receive a command from one of a chassis management module and a BIOS specifying a data region to be updated and a locking policy;
determine if the data region is locked;
if it is determined that the data region is not locked, implement the locking policy and return a session lock handle;
receive, from the one of the chassis management module and the BIOS, data for updating the data region, the session lock handle, and an offset;
determine that the session lock handle is associated with the data region;
write the data to the data region at the offset;
receive a request for data of the updated data region from the other one of the chassis management module and the BIOS;
determine if the updated data region is locked; and
if it is determined that the updated data region is not locked, provide the data of the updated data region to the other one of the chassis management module and the BIOS.

9. An apparatus according to claim 8, wherein the command and the request conform to an Intelligent Platform Management Interface specification.

10. An apparatus according to claim 8, wherein the baseboard management controller is further to:
receive, before receiving the request, a command indicating that no more data will be transmitted in association with the session lock handle.

11. An apparatus according to claim 8, wherein the baseboard management controller is further to:
transmit, if it is determined that the data region is locked, an error message to the one of the chassis management module and the BIOS.

12. An apparatus according to claim 8, wherein the baseboard management controller is further to:
transmit, if it is determined that the updated data region is locked, an error message to the other one of the chassis management module and the BIOS.

13. An apparatus according to claim 8, wherein the locking policy comprises a preemptable lock.

14. An apparatus according to claim 8, wherein the baseboard management controller is further to:
reset an update timeout in response to receiving the data for updating the data region, the session lock handle, and the offset.

* * * * *